US008912265B2

(12) United States Patent
Eaton et al.

(10) Patent No.: US 8,912,265 B2
(45) Date of Patent: Dec. 16, 2014

(54) METHOD FOR EXFOLIATING ORGANOCLAY TO PRODUCE A NANOCOMPOSITE

(75) Inventors: Robert F. Eaton, Belle Mead, NJ (US); Mohamed Esseghir, Monroe Township, NJ (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 872 days.

(21) Appl. No.: 12/993,129

(22) PCT Filed: Jun. 18, 2009

(86) PCT No.: PCT/US2009/047749
§ 371 (c)(1),
(2), (4) Date: Nov. 17, 2010

(87) PCT Pub. No.: WO2010/002598
PCT Pub. Date: Jan. 7, 2010

(65) Prior Publication Data
US 2011/0071243 A1    Mar. 24, 2011

Related U.S. Application Data

(60) Provisional application No. 61/076,914, filed on Jun. 30, 2008.

(51) Int. Cl.
*C08K 5/541* (2006.01)
*B82Y 30/00* (2011.01)
*C01B 33/44* (2006.01)
*C08J 3/22* (2006.01)
*C09C 1/42* (2006.01)
*C08J 5/00* (2006.01)

(52) U.S. Cl.
CPC .............. *C08J 3/226* (2013.01); *B82Y 30/00* (2013.01); *C01B 33/44* (2013.01); *C08J 5/005* (2013.01); *C09C 1/42* (2013.01); *C01P 2004/03* (2013.01); *C08J 2323/02* (2013.01); *C08J 2323/16* (2013.01); *C08J 2423/00* (2013.01)
USPC ........................................................ 524/445

(58) Field of Classification Search
CPC ......... B82Y 30/00; C01B 33/44; C08J 3/226; C08J 5/005; C08J 2323/02; C08J 2323/16; C08J 2423/00; C09C 1/42; C01P 2004/03
USPC ........................................................ 524/445
See application file for complete search history.

(56) References Cited

U.S. PATENT DOCUMENTS

| 5,717,000 A | 2/1998 | Karande et al. |
| 5,780,376 A | 7/1998 | Gonzales et al. |
| 5,973,053 A | 10/1999 | Usuki et al. |
| 6,156,835 A | 12/2000 | Anderson et al. |
| 6,287,992 B1 | 9/2001 | Polansky et al. |
| 7,084,197 B2 * | 8/2006 | Chin et al. ............ 524/99 |
| 2005/0197457 A1 * | 9/2005 | Chaudhary et al. ........... 525/191 |
| 2007/0145625 A1 * | 6/2007 | Caronia et al. .................. 264/51 |

FOREIGN PATENT DOCUMENTS

| WO | 03002651 A1 | 1/2003 |
| WO | 2007039421 A1 | 4/2007 |
| WO | 2008154096 A1 | 12/2008 |
| WO | 2009023425 A1 | 2/2009 |

OTHER PUBLICATIONS

Ray et al., Progress in Materials Science, 50, pp. 962-1079, 2005.

* cited by examiner

*Primary Examiner* — Angela C Scott
(74) *Attorney, Agent, or Firm* — Whyte Hirschboeck Dudek S.C.

(57) ABSTRACT

Nano-composites that comprise a thermoplastic polymer (TPO) and an exfoliated organoclay are prepared by a method comprising contacting under exfoliating conditions at least one molten TPO polymer with at least one organoclay and at least one exfoliating agent of H-TEMPO or an amine precursor to H-TEMPO such that the exfoliating agent exfoliates the organoclay.

18 Claims, 1 Drawing Sheet

METHOD FOR EXFOLIATING ORGANOCLAY TO PRODUCE A NANOCOMPOSITE

CROSS-REFERENCE TO RELATED APPLICATION

The present application claims priority to U.S. patent application Ser. No. 61/076,914, filed on Jun. 30, 2008, the entire content of which is incorporated by reference herein.

FIELD OF THE INVENTION

This invention relates to fillers for thermoplastic polymers, particularly thermoplastic olefin (TPO) polymers. In one aspect, the invention relates to multi-layer silicate fillers, particularly organoclays, while in another aspect, the invention relates to a method for delaminating the silicate filler while blending the filler with the polymer. In yet another aspect, the invention relates to compositions comprising a TPO polymer and delaminated silicate filler.

BACKGROUND OF THE INVENTION

Thermoplastic polymers, particularly TPO polymers such as polyethylene, polypropylene, ethylene/propylene/diene monomer (EPDM) rubber, etc., are particularly well suited for a wide variety of uses. However, because of their low stiffness and toughness properties relative to various engineering plastics, e.g., nylons, polysulfones, polycarbonates and the like, thermoplastic polymers are typically blended with one or more fillers to enhance these properties. Fillers that are planar in morphology, i.e., have a relatively high aspect ratio, tend to impart better stiffness and toughness to the TPO polymer than fillers with a nonplanar morphology, i.e., fillers with a low aspect ratio. Representative of the planar fillers are the organoclays and talc, and representative of the nonplanar fillers are glass beads.

The morphology of the planar fillers can be likened to a deck of cards with each card representing one plane of the filler. The planes or layers of the filler, e.g., an organoclay, are held together by ionic bonds to exchangeable cations that are located between the planes. If the cards or planes can be separated from one another, i.e., delaminated, the deck or filler will mix better with whatever it is blended, e.g., a TPO polymer. Planes are typically separated from one another by exchanging the natural occurring cation with a larger atom or molecule, and the greater the separation introduced between the planes, the better the mixing. If the spacing between the planes is increased but without sliding by one another to any significant degree (the spaces between the cards of the deck are widened (swollen) but the deck retains its overall shape), the filler is intercalated. If the spacing is increased to such an extent that the planes slide by one another (the cards of the deck are no longer positioned atop one another but rather scattered about but retaining some degree of overlap and thus the "deck" is shorter but much wider and/or longer), the filler is exfoliated. Exfoliated filler is typically a mix of "exfoliated" planes and intercalated planes, e.g., some of the "scattered" planes are "short" decks of swollen planes.

In the context of increasing the stiffness and/or toughness of a TPO polymer with planar filler, ideally the filler is exfoliated to the extent that the planes of the filler are reduced to a single layer, i.e., that none of the cards of the deck are atop one another. Because TPO polymers are nonpolar and many, if not all, planar fillers are polar, particularly the organoclays, exfoliating the filler in the presence of a TPO polymer, i.e., under conditions in which the non-exfoliated organoclay and TPO polymer are in blending contact with one another, to achieve full or homogeneous mixing of the polymer with the individual layers of the filler is very difficult. Efforts to date have not met with satisfactory success.

Montmorillonite is an organoclay, a multi-layer silicate. In its natural state, its layers are held together by ionic bonds to exchangeable cations located between the layers. As discussed by Kawasumi, et al. in Macromolecules, 1997, pp. 6333-6338, when such a silicate is blended with softened or melted polypropylene, the resulting shear forces are not sufficient to delaminate or exfoliate the silicate layers even when the cation is a quaternary ammonium ion because polypropylene is a relatively nonpolar polymer.

Usuki, et al., U.S. Pat. No. 5,973,053, solved this problem using two related but different approaches. The first approach (also described by Kawasumi, et al.) was to blend a quaternary ammonium-exchanged, multi-layered silicate with a maleic anhydride-modified polypropylene oligomer, and then add an unmodified polypropylene polymer. The maleic anhydride-modified polypropylene oligomer had sufficient polarity to exfoliate the silicate under the shear conditions of the blending process.

The second approach of Usuki, et al. was to blend a quaternary ammonium-exchanged, multi-layered silicate with a maleic anhydride modified polypropylene polymer. The maleic anhydride-modified polypropylene polymer had sufficient polarity to exfoliate the silicate under the shear conditions of the blending process.

Usuki, et al. pointed out that if a maleic anhydride-modified polypropylene oligomer was not used, then the average molecular weight of the maleic anhydride-modified polypropylene polymer should be limited to about 100,000.

BRIEF SUMMARY OF THE INVENTION

In one embodiment, the invention is a method to produce a nano-composite that comprises a TPO polymer and an exfoliated organoclay, the method comprising contacting under exfoliating conditions at least one molten TPO polymer with at least one organoclay and at least one exfoliating agent of H-TEMPO or an amine precursor to H-TEMPO, such that the exfoliating agent exfoliates the organoclay.

In another embodiment, the invention is a masterbatch comprising a TPO polymer, an exfoliated organoclay, and at least one of H-TEMPO or an amine precursor to H-TEMPO.

BRIEF DESCRIPTION OF THE DRAWING

The FIGURE is an electron micrograph of the exfoliated organoclay (Cloisite® 15A) used in Example 1.

DETAILED DESCRIPTION OF THE INVENTION

For purposes of United States patent practice, the contents of any referenced patent, patent application or publication are incorporated by reference in their entirety (or its equivalent US version is so incorporated by reference) especially with respect to the disclosure of synthetic techniques, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, additive content, etc., is from 100 to 1,000, it is intended that all individual values, such as 100, 101, 102, etc., and sub ranges, such as 100 to 144, 155 to 170, 197 to 200, etc., are expressly enumerated. For ranges containing values that are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, component content of compositions.

"Blend" and like terms mean a composition of two or more compounds, typically two or more polymers. Such a blend may or may not be miscible. Such a blend may or may not be phase separated. Such a blend may or may not contain one or more domain configurations, as determined from transmission electron spectroscopy, light scattering, x-ray scattering, or any other method known in the art. In the context of this invention, blend includes two or more thermoplastic polymers (none, one, two or more molten), or a thermoplastic polymer (molten or otherwise) and an organoclay (exfoliated or otherwise).

"Composition" and like terms means a mixture or blend of two or more components. One composition of this invention is the mix comprising a thermoplastic polymer, non-exfoliated organoclay and H-TEMPO, while another composition of this invention is the mix comprising a TPO polymer and exfoliated organoclay.

"Blending contact" and like terms mean two or more components of a blend or composition in which the components are in intimate contact with one another, such as the contact between two polymers or a polymer and a filler within and during the operation of a mixing extruder.

"Exfoliated organoclay" and like terms mean a delaminated organoclay, i.e., an organoclay in which its components layers are separated but with some minor amount of overlap from one another relative to their natural state. Exfoliated organoclay includes, in the context of this invention, intercalated organoclay.

"Exfoliating agent" and like terms mean H-TEMPO or an amine precursor to H-TEMPO that can, under exfoliating conditions, delaminate an organoclay in the presence of a TPO polymer.

"Exfoliating conditions" and like terms mean the temperature, pressure, shear, contact time and other parameters necessary for H-TEMPO or an amine precursor to H-TEMPO delaminate an organoclay in the presence of molten TPO polymer.

"Nano-composite" and like terms mean a composition comprising an intercalated or exfoliated organoclay. Typically, on a molecular scale the layers or planes of the organoclay is not in excess of about 6 layers thick as determined by electron microscopy. Nano-composites include masterbatches and fully formulated compositions.

"Masterbatch" and like terms mean an intermediate or precursor composition comprising a concentrated amount of one component for addition to and dilution in another composition. In the context of this invention, a masterbatch is a composition that comprises an excess amount of organoclay, exfoliated or otherwise, carried in a polymer for the purpose of introducing the organoclay into another polymer. The amount of organoclay in the masterbatch is typically such that upon addition of the masterbatch to another polymer, the resulting composition contains a lesser but desired concentration of the organoclay. The polymer of the masterbatch and the polymer of the composition to which it is added is typically the same.

The inventive method can be used to produce a nanocomposite of any suitable thermoplastic polymer resin or polymer resin blend and an exfoliated organoclay. Suitable thermoplastic polymer resins include, for example, polyolefins, such as polyethylene or polypropylene homopolymers and copolymers, ethylene/vinyl acetate (EVA) copolymer or ethylene-propylene elastomers, otherwise known as ethylene-propylene-rubber (EPR), terpolymers elastomers made from ethylene-propylene diene monomer (EPDM), polyvinylchloride (PVC), polysiloxanes and the like. The organoclays exfoliate better in the presence of polymers without polar functionality, e.g., polyolefins such as polyethylene, polypropylene, EPR, EPDM, etc., than in the presence of polymers with polar functionality, e.g., EVA, PVC, etc.

In one preferred embodiment, the method is used to produce a nano-composite from a TPO elastomer, particularly EPDM. Exfoliating organoclay in EPDM is difficult to accomplish. Generally maleic anhydride copolymers are required to exfoliate an organoclay in EPDM rubber. As such, the current invention is both unexpected and highly desirable.

In another preferred embodiment, the inventive method is used to produce a nano-composite of a TPO resin and an organoclay. In one variation of this embodiment, the TPO resin is a blend, typically a mechanical (as opposed to an in-reactor) blend, of a polyolefin (such as medium or low density polyethylene or polypropylene) and a thermoplastic elastomer (such as EPDM or an ultra low density polyethylene). The use of polypropylene-based TPO articles at a low temperature is limited because polypropylene-based TPO articles have relatively poor low temperature impact toughness and as such, the polypropylene is typically blended with an elastomer and/or filler to impart low-temperature impact resistance to the finished article.

The organoclay (also known as organophilic clay) used in the practice of this invention is generally an organopolysilicate. Organoclays are made by reacting, via ion exchange mechanisms, organocations with natural clays. The organocations exchange with the natural interlayer cations of the clay to generate organophilic surfaces while maintaining a lamellar structure similar to the natural clay. Typically, the organocations are quaternary ammonium compounds. Common examples of organoclays include clays, such as kaolin or montmorillonite, to which organic structures have been chemically bonded. Organoclays used in the invention may have an excess of quaternary ammonium compounds. More details of producing organoclays can be found in U.S. Pat. No. 5,780,376. Organoclays are also commercially available, such as the CLOISITE® line of natural montmorillonite clays modified with quaternary ammonium salts available from Southern Clay Products, Inc.

The organoclay can comprise up to 25 weight percent (wt %) of the composition, e.g., the combined weight of the polymer, organoclay and any additives. In some embodiments, the amount of organoclay ranges from 2 to 6 wt % based on the total weight of the composition. In other embodiments, the amount of organoclay is less than about 1%, preferably in the range of 0.125 to 0.25 wt % based on the total weight of the composition.

The exfoliating agent is H-TEMPO or an amine precursor to H-TEMPO, and H-TEMPO has the chemical structural formula of (I):

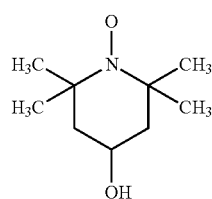

(I)

An amine precursor of H-TEMPO is 4-hydroxy-2,2,6,6-tetramethyl piperidine.

The amount of exfoliating agent used in the practice of this invention depends in large part on the extent of desired exfoliation. For example, 5 wt % of H-TEMPO is suitable to exfoliate at least 5 wt % of organoclay, all wt % based on the total weight of the composition.

The composition can also contain flame retardants and other fillers (planar or not in morphology) including, calcium carbonate, glass fibers and/or beads, marble dust, cement dust, feldspar, silica or glass, fumed silica, silicates, alumina, various phosphorus compounds, ammonium bromide, antimony trioxide, antimony trioxide, zinc oxide, zinc borate, barium sulfate, silicones, aluminum silicate, calcium silicate, titanium oxides, glass microspheres, chalk, mica, clays, wollastonite, ammonium octamolybdate, intumescent compounds, expandable graphite, and mixtures of two or more of these compounds. The fillers may contain various surface coatings or treatments, such as silanes, fatty acids, and the like. Halogenated organic compounds including halogenated hydrocarbons such as chlorinated paraffin, halogenated aromatic compounds such as pentabromotoluene, decabromodiphenyl oxide, decabromodiphenyl ethane, ethylene-bis(tetrabromophthalimide) and other halogen-containing flame retardants can also be employed. These other fillers are typically used, if used at all, in the same manner and amounts as is known and conventional in the art, e.g., between 2 and 80, preferably between 5 and 70, wt % based on the weight of the composition. If one or more of these other fillers are used in the practice of this invention, then they can be added after the organoclay has been exfoliated in the presence of the thermoplastic resin.

The composition can also contain other additives including, but not limited to, antioxidants (e.g., hindered phenols such as IRGANOX™ 1010 and phosphites such as IRGAFOS™ 168, both available from Ciba Specialty Chemicals), UV stabilizers, cling additives, light stabilizers (such as hindered amines), plasticizers (such as dioctylphthalate or epoxidized soy bean oil), thermal stabilizers, mold release agents, tackifiers (such as hydrocarbon tackifiers), waxes (such as polyethylene waxes), processing aids (such as oils, organic acids such as stearic acid, metal salts of organic acids), crosslinking agents (such as peroxides or silanes), and colorants and pigments. Any and all of these other additives can be used to the extent that they do not interfere with desired physical or mechanical properties of the compositions.

The organoclay can be blended with the thermoplastic polymer by any method that provides adequate distribution and mixing. Typically, the organoclay is melt mixed with the resin in a melt mixer, extruder or similar equipment. Techniques for melt blending of a polymer with additives of all types are known in the art and can typically be used in the practice of this invention. Typically, in a melt blending operation useful in the practice of this invention, the thermoplastic polymer is heated to a temperature sufficient to form a polymer melt and then combined with the desired amount of the organoclay in a suitable mixer, such as an extruder, a Banbury Mixer, a Brabender mixer, or a continuous mixer. The composite may be prepared by adding the exfoliating agent to the polymer and the organoclay in the melt at a temperature equal to or greater than the melting point of the polymer and mixing the components by means of mechanical shearing. Shearing may be achieved by introducing the polymer melt at one end of an extruder (single or double screw) and receiving the sheared polymer at the other end of the extruder. The temperature of the melt, residence time of the melt in the extruder and the design of the extruder (single screw, twin screw, number of flights per unit length, channel depth, flight clearance, mixing zone and the like) are the several variables by which control the amount of shear is applied.

Alternatively, the polymer may be first granulated and dry-mixed with the organoclay, and then the dry mix heated in a mixer until the polymer is melted to form a flowable mixture. The exfoliating agent is then added to the flowable mixture. This flowable mixture with the exfoliating agent can then be subjected to a shear in a mixer sufficient to form the desired composition. The polymer may also be heated in the mixer to form a flowable mixture prior to the addition of the organoclay and exfoliating agent. The organoclay, nitroxide compound and polymer resin are then subjected to a shear sufficient to form the desired composition.

Exfoliated organoclays can broadly increase stiffness and toughness and improve the barrier properties of polymers. They can allow polyolefins to replace some engineering plastics in demanding applications. The TPO nano-composite or EPDM nano-composite of the instant invention can be used, for example, to make articles of manufacture such as parts for motor vehicles, appliances, business machines or construction articles. The barrier properties imparted can make polyolefin and other oil- and grease-sensitive polymers for use in "under-hood" and related automotive applications. Further, exfoliated organoclays can improve the flame retardant effectiveness of organoclays for end uses as broad as circuit boards, clothing, wire and cable jackets, computer housings, and auto interior and exterior parts. Other applications include improvement in the paintability of polyolefins and other nonpolar plastics without the need for one or more preparation steps, e.g., the application of a primer, etching, etc., and increasing the efficiencies of organic light emitting diodes. Moreover, the upper use temperatures of non-olefinic polymers can be improved by the addition of exfoliated clays as can the efficiency of nucleating agents for a variety of polymers which can, in turn, lead to improved optical clarity, heat of deflection temperature, electrical conductivity, rigidity and the like.

The following examples are to illustrate the invention, and not to limit it. Ratios, parts and percentages are by weight unless otherwise stated.

SPECIFIC EMBODIMENTS

Examples 1-2 and Comparative Examples A-D

NORDEL® 3722, an EPDM is ethylene/propylene/diene low crystalline rubber. It has a Mooney viscosity @ 125° C. of about 18 by ASTM D-1646. It is approximately 71 weight percent ethylene and about 0.5 weight percent ethylidene norbornene. It is used as the thermoplastic polymer to produce the compositions of Examples 1-2 each of which contain H-TEMPO and a CLOISITE® organoclay. CLOISITE A and B are made from Montmorillonite by ion exchanging a fatty ammonium ion for the sodium ion from the clay interior. CLOISITE 30 contains one fatty constituent on the nitrogen;

15A has two fatty groups on the nitrogen. CLOISITE Na+ is a natural clay (i.e., it is not ion exchanged). The same EPDM is used to produce Comparative Examples A-D. For both Examples and the Comparative Examples, the EPDM polymer is fluxed in a Brabender at 80-110° C., the clay (or silica) is added and then, when applicable, the H-TEMPO is added. Films are pressed to about 80 mil plaques, and dog bones (one inch gauge length) are cut and measured at 2 inches/mm on an Instron Tensile tester. The compositions and modulus results are reported in Table 1.

TABLE 1

Compositions and Moduli of Ex. 1-2 and CE-A-D

| Material | Ex. 1 | Ex. 2 | CE-A | CE-B | CE-C |
|---|---|---|---|---|---|
| EPDM | 90 | 90 | 90 | 95 | 100 |
| H-TEMPO | 5 | 5 | 5 | 5 | 0 |
| Cloisite 15A | 5 | 0 | 0 | 0 | 0 |
| Cloisite 30B | 0 | 5 | 5 | 0 | 0 |
| Cloisite Na+ | 0 | 0 | 5 | 0 | 0 |
| Total | 100 | 100 | 100 | 100 | 100 |
| Filler | 5 | 5 | 5 | 0 | 0 |
| 2"/min modulus Tensile Modulus (psi) | 3687 | 2661 | 2376 | 2171 | 1892 |

Examples 1 and 2 report improved modulus over the Comparative Examples. The modulus of the composition of Example 1 (5% Cloisite 15A and 5% H-TEMPO) is double that of the composition of CE-D (Nordell 3722 neat). Examples 1 and 2 exhibit higher modulus than the various controls without both the H-TEMPO and the organoclay. CLOISITE A, with two fatty substitutions, exhibits the highest modulus.

The electron micrograph of the FIGURE shows that Cloisite 15A of the Example 1 is exfoliated.

Examples 3-4 and Comparative Example E

The compositions of Examples 3-4 and Comparative Example E are prepared with the same materials and in the same manner as the compositions reported in Table 1. The compositions are tested for volume resistivity, an electrical insulation property in which a higher value means better insulation. The compositions and volume resistivity results are reported in Table 2.

TABLE 2

Compositions and Volume Resistivity of Ex. 5-6 and CE-E

| Material | CE-E | Ex. 5 | Ex. 6 |
|---|---|---|---|
| EPDM | 98.68 | 98.305 | 98.18 |
| DiCup Peroxide | 1.32 | 1.32 | 1.32 |
| H-TEMPO | 0 | 0.25 | 0.25 |
| Cloisite 15A | 0 | 0.125 | 0.25 |
| Volume Resistivity | $1.37 \times 10^{14}$ | $2.49 \times 10^{15}$ | $3.63 \times 10^{15}$ |

The addition of the H-TEMPO and the organoclay show up to ten times higher resistivity compared to the pure crosslinked NORDEL rubber. Higher resistivity, lower electrical conductivity, indicates that the electrical insulation properties are enhanced by the clay and H-TEMPO modification.

What is claimed is:

1. A method to produce a nano-composite that comprises a thermoplastic olefin (TPO) polymer and an exfoliated organoclay, the method comprising:
    contacting at least one molten TPO polymer with at least one organoclay by mixing the organoclay with the molten TPO polymer;
    dispersing the organoclay within the molten TPO polymer to obtain a molten TPO polymer/organoclay blend;
    adding at least one exfoliating agent of 4-hydroxy-2,2,6,6-tetramethylpiperidin-1-oxyl (H-TEMPO) or an amine precursor to H-TEMPO to the molten TPO polymer/organoclay blend;
    mixing the exfoliating agent with the TPO polymer/organoclay blend by mechanical shearing such that the exfoliating agent exfoliates the organoclay; and
    forming a nano-composite having delaminated organoclay, wherein the organoclay is present in an amount from 0.125 to 0.25 wt % based on the total weight of the nano-composite.

2. The method of claim 1 in which the TPO polymer comprises at least one of a polyolefin, an ethylene/vinyl acetate (EVA) copolymer, an ethylene-propylene elastomer, a terpolymer elastomer made from ethylene-propylene diene monomer (EPDM), or a polyvinylchloride (PVC).

3. The method of claim 2 in which the polyolefin comprises polyethylene or polypropylene homopolymers and copolymers.

4. The method of claim 2 in which the TPO polymer comprises EPDM.

5. The method of claim 2 in which the TPO polymer comprises at least one of a polyolefin, an ethylene-propylene elastomer, or a terpolymer elastomer made from ethylene-propylene diene monomer (EPDM).

6. The method of claim 1 in which the exfoliating agent is H-TEMPO.

7. The method of claim 1 in which the step of mixing the exfoliating agent with the TPO polymer/organoclay blend by mechanical shearing comprises introducing the exfoliating agent and TPO polymer/organoclay blend at one end of an extruder and receiving the nano-composite having delaminated organoclay at a second end of the extruder.

8. The method of claim 7 further comprising controlling the amount of shear applied.

9. The method of claim 1 comprising forming a nano-composite having delaminated organoclay with planes of the organoclay not in excess of 6 layers thick.

10. A method to produce a nano-composite that comprises a thermoplastic olefin (TPO) polymer and an exfoliated organoclay, the method comprising:
    contacting at least one molten TPO polymer with at least one organoclay by mixing the organoclay with the molten TPO polymer;
    dispersing the organoclay within the molten TPO polymer to obtain a molten TPO polymer/organoclay blend;
    adding at least one exfoliating agent of 4-hydroxy-2,2,6,6-tetramethylpiperidin-1-oxyl (H-TEMPO) or an amine precursor to H-TEMPO to the molten TPO polymer/organoclay blend;
    mixing the exfoliating agent with the TPO polymer/organoclay blend by mechanical shearing such that the exfoliating agent exfoliates the organoclay; and
    forming a nano-composite having delaminated organoclay, wherein the organoclay is (i) present in an amount from 2-6 wt % based on the total weight of the nano-composite or (ii) present in an amount of less than 1 wt % based on the total weight of the nano-composite.

11. The method of claim 10 in which the TPO polymer comprises at least one of a polyolefin, an ethylene/vinyl acetate (EVA) copolymer, an ethylene-propylene elastomer, a terpolymer elastomer made from ethylene-propylene diene monomer (EPDM), or a polyvinylchloride (PVC).

12. The method of claim 11 in which the polyolefin comprises polyethylene or polypropylene homopolymers and copolymers.

13. The method of claim 11 in which the TPO polymer comprises EPDM.

14. The method of claim 10 in which the exfoliating agent is H-TEMPO.

15. The method of claim 10 in which the step of mixing the exfoliating agent with the TPO polymer/organoclay blend by mechanical shearing comprises introducing the exfoliating agent and TPO polymer/organoclay blend at one end of an extruder and receiving the nano-composite having delaminated organoclay at a second end of the extruder.

16. The method of claim 15 further comprising controlling the amount of shear applied.

17. The method of claim 11 in which the TPO polymer comprises at least one of a polyolefin, an ethylene-propylene elastomer, or a terpolymer elastomer made from ethylene-propylene diene monomer (EPDM).

18. The method of claim 10 comprising forming a nano-composite having delaminated organoclay with planes of the organoclay not in excess of 6 layers thick.

\* \* \* \* \*